May 21, 1968     M. J. STURTEVANT     3,383,800
GLASS WINDOW SLIDE DEVICE
Filed Aug. 22, 1966     3 Sheets-Sheet 2
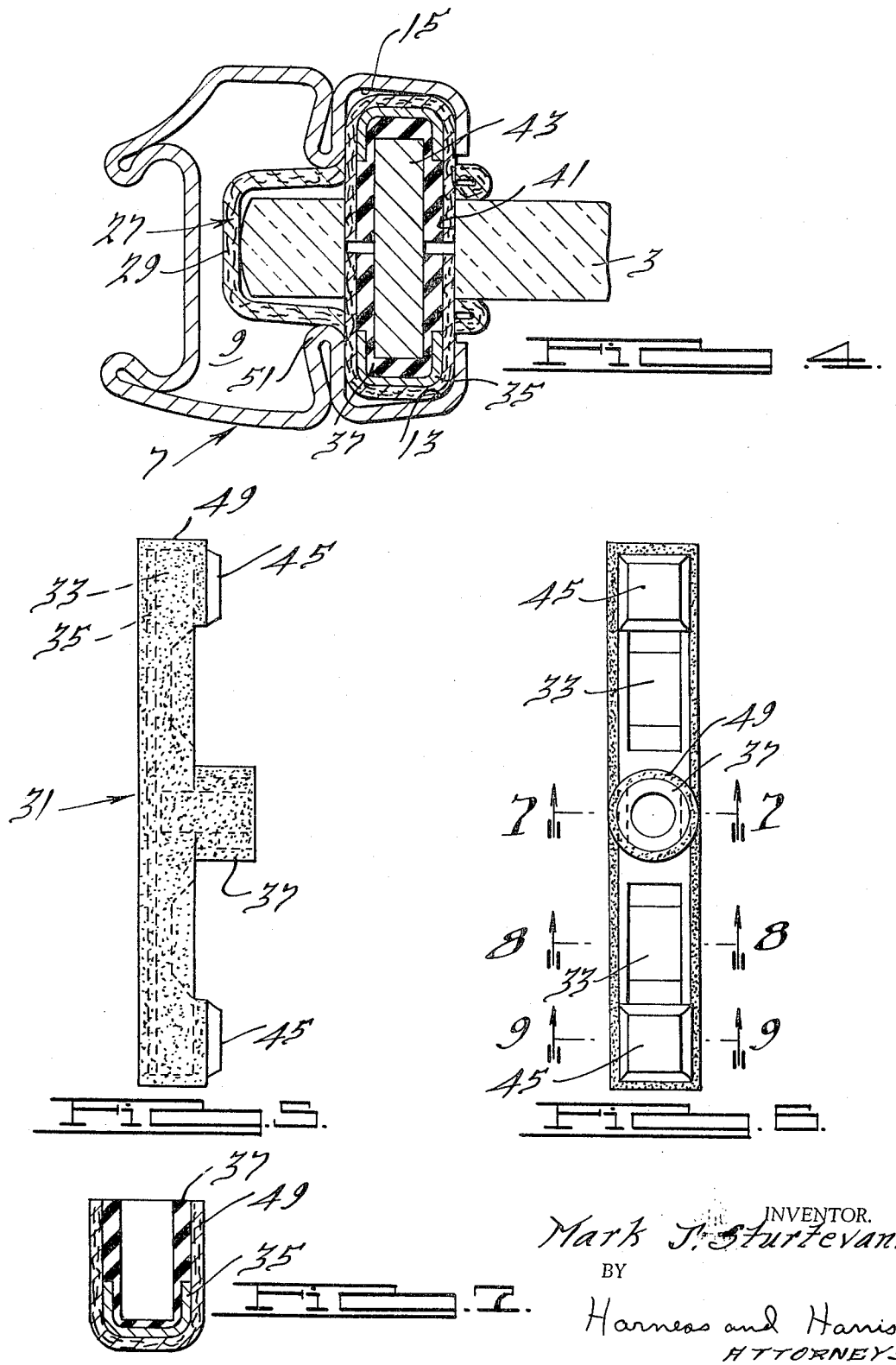
INVENTOR.
Mark J. Sturtevant
BY
Harness and Harris
ATTORNEYS.

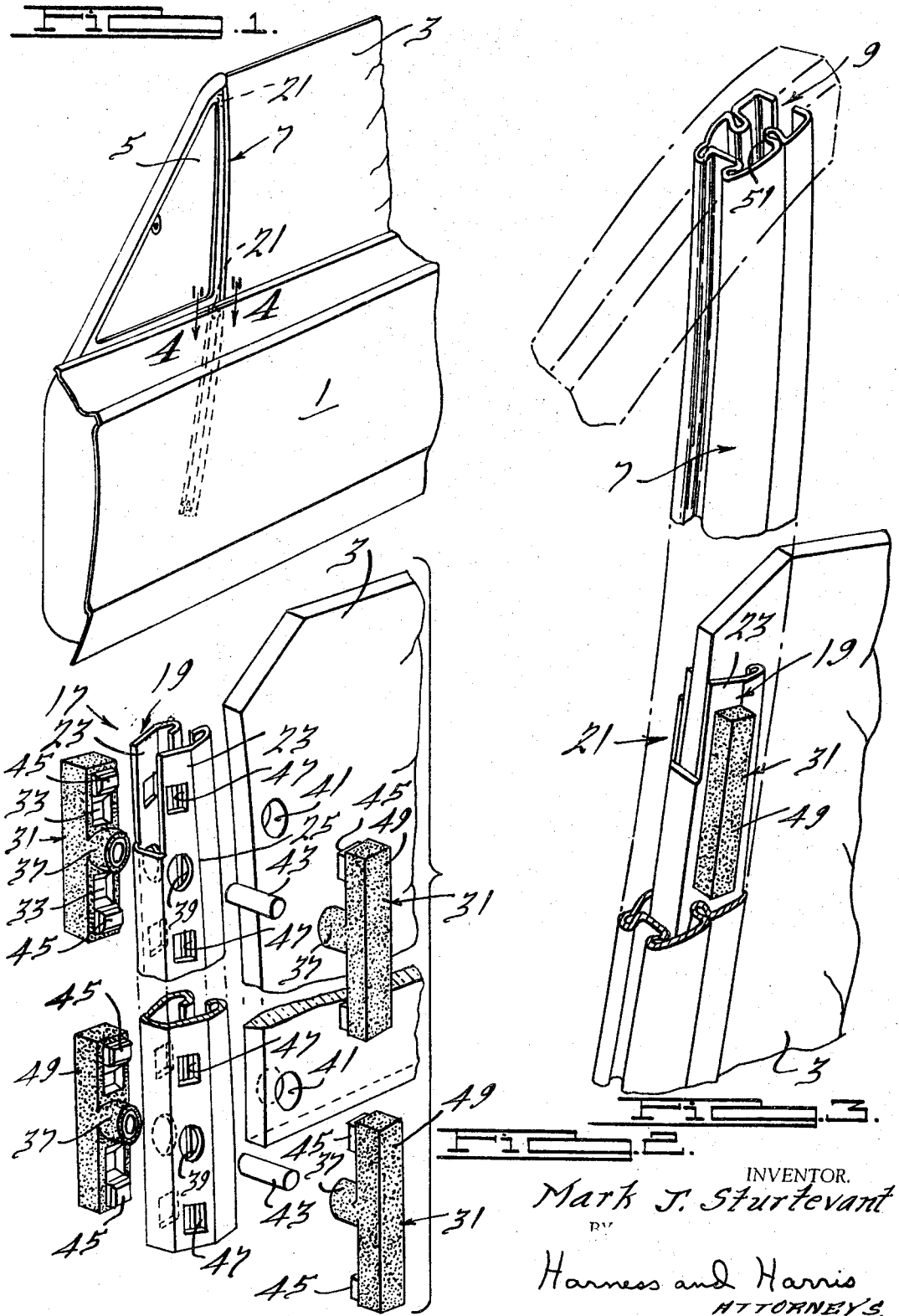

May 21, 1968     M. J. STURTEVANT     3,383,800
GLASS WINDOW SLIDE DEVICE
Filed Aug. 22, 1966     3 Sheets-Sheet 3
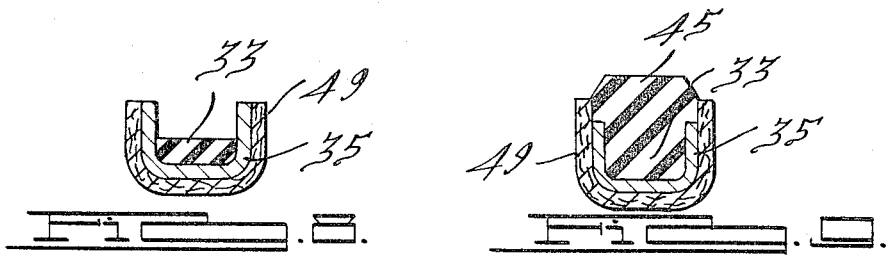
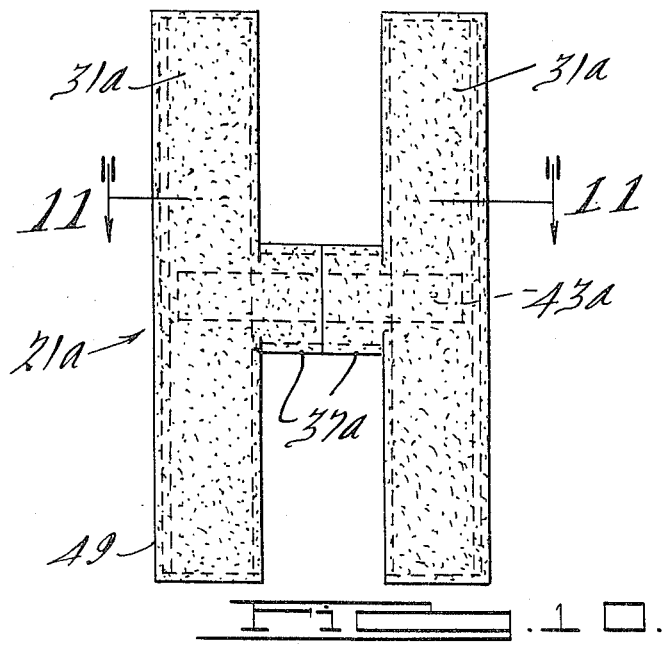
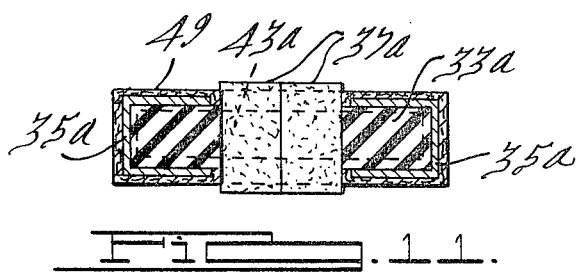
INVENTOR.
Mark J. Sturtevant
BY
Harness and Harris
ATTORNEYS.

United States Patent Office 3,383,800
Patented May 21, 1968

3,383,800
GLASS WINDOW SLIDE DEVICE
Mark J. Sturtevant, Grosse Pointe, Mich., assignor to Chrysler Corporation, Highland Park, Mich., a corporation of Delaware
Filed Aug. 22, 1966, Ser. No. 574,236
12 Claims. (Cl. 49—428)

This invention relates to devices for guiding sliding glass windows, and more particularly to devices for guiding the movement of window glass in automotive vehicles.

Automobiles which have a vent window at the upper forward corner of the front doors thereof have a vent window division bar between the front door window glass and the vent window glass. This division bar usually extends from near the bottom of the door assembly to the top thereof and has a channel in which the forward or leading edge of the door window glass rides. These door glass windows are subjected to an outwardly directed force, due to air intake vents, etc., which increases as the speed of the automobile increases. This force is greatest in the area of the window which is adjacent the division bar. Accordingly, to reduce the possibility of window breakage, it is important that the division bar not only be relatively strong, but that the guide device on the front of the window prevent undue play between the leading edge of the window and the division bar. Moreover, it is important that the sliding joint formed by the channel and leading edge of the window not only be waterproof to prevent water leakage into the automobile, but that it also prevent any sideward or fore and aft rocking motion of the glass without rendering it extremely difficult to raise and lower the window.

One of the problems of previously known types of window moving mechanisms has been the requirement of a double or so called X-arm type of regulator mechanism to insure that the forward edge of the window was maintained in the division bar as the window was raised and lowered, i.e., to insure that the window movement was parallel to the division bar. The X-arm type of regulator mechanism not only was relatively expensive, but also required the removal of the door trim panel if it became necessary to adjust it. The present invention allows a single point connection between the window and the regulator mechanism, thereby permitting the use of a regulator mechanism which is less expensive and easier to adjust, i.e., adjustment of the door vent window and door glass assembly does not require the adjustment of the regulator and may be accomplished without the removal of the door trim panel.

Accordingly, one of the primary objects of this invention is to provide a device for guiding a window glass during raising and lowering movements of the latter which permits a single point connection between the window and the regulator mechanism, and which substantially eliminates any sideward or fore and aft rocking motion of the glass while permitting the latter to be raised and lowered with little effort.

A further object of this invention is to provide a glass slide device such as described which provides far more permanent alignment and subsequent freedom from looseness and rattles.

Another object of this invention is to provide a slide device of the glass described which provides improved glass stability throughout the complete range of window movement.

A further object of this invention is to provide a slide device such as described which is securely connected to the window glass and which is adapted to slide freely in the division bar channel.

Still another object of this invention is to provide a slide device of the type described which forms a watertight joint with the division bar.

A further object of this invention is to provide a slide device such as described which is simple and economical in construction and effective in operation.

Other objects and features of this invention will become apparent as the description progresses.

In the accompanying drawings, in which two of various possible embodiments are illustrated;

FIG. 1 is a perspective view of the front door of an automobile showing the general location of the device of this invention;

FIG. 2 is an enlarged expanded fragmentary view of FIG. 1;

FIG. 3 is an enlarged fragmentary view of FIG. 1, certain parts being in a moved position;

FIG. 4 is an enlarged section taken along line 4—4 of FIG. 1;

FIG. 5 is an enlarged side elevation of one portion of the device of this invention;

FIG. 6 is an end elevation of FIG. 5, taken from the right-hand end of FIG. 5;

FIGS. 7, 8 and 9 are sections taken respectively along lines 7—7, 8—8 and 9—9 of FIG. 6;

FIG. 10 is a front elevation of a modification of this invention; and

FIG. 11 is a section taken on line 11—11 of FIG. 10.

In the drawings, like parts are indicated by corresponding reference characters throughout all of the views.

Referring now to the drawings, a typical front door of an automobile is generally indicated at 1 in FIG. 1. The front door has a window glass 3 and vent window 5 mounted therein with a division bar 7 separating the two windows.

Division bar 7 is formed on one side thereof to receive a rubber stop and seal (not shown) for the rearward edge of the vent window 5 when the latter is swung to a closed position. The other side of division bar 7 is recessed as indicated at 9 to provide a main support channel 11 which has two opposed side channels 13 and 15 therein. The division bar 7 extends into the bottom portion of door 1 and channels 11, 13 and 15 extend throughout the entire length of the bar.

The window glass 3 is held in the channel 11 by means of the slide device 17 of this invention. Device 17 basically includes a length of weatherstripping 19, formed about the forward edge of glass 3, and two guides 21 connecting the weatherstripping 19 to the glass at the upper and lower ends of the weatherstripping. Weatherstripping 19 has two opposed side portions 23 which extend rearwardly from the forward edge of the glass. The side portions 23 preferably are bowed outwardly slightly with an elongated crease or fold 25 (FIG. 2) therein prior to installation of the weatherstripping for a purpose to be described hereinafter. The weatherstripping is preferably formed of a plastic sheet material 27 (FIG. 4) such as Mylar, having a flocking 29 such as Dacron flocking, on the outside thereof.

Each guide 21 comprises a pair of generally vertically extending elongate shoes 31 located on opposite sides of glass 3. Each shoe 31 has a body portion 33 formed of rubber, for example, and a longitudinally extending metal reinforcing insert 35 in the rubber. Insert 35 is generally U-shaped in horizontal cross section. At the center of each shoe 31 a tubular projection 37 extends inwardly through a hole 39 in weatherstripping and an aligned hole 41 in glass 3 toward the opposing shoe. A pin 43 extends from the tubular projection 37 on one shoe into the tubular projection 37 on the opposed shoe for locking the shoes together. Each end of each shoe is also provided with a foot portion 45 which extends through a hole 47 in the adjacent weatherstrip 19 into abutting contact with glass 3. The shoes 31 are covered with a flocking 49 on the outside thereof to facilitate sliding of the shoes in side channels 13 and 15.

Installation of the slide device 17 of this invention on a glass 3 and division bar 7 is as follows:

First, the weatherstripping 19 is placed over the forward edge of glass 3 with the holes 39 therein horizontally and vertically aligned with holes 41. At this point of the installation, the sides 23 of the weatherstripping in the central portion of the latter are still bowed slightly (see FIG. 2) due to the crease or fold 25. Next, the two shoes 31 of each guide 21 are placed on the outside of weatherstripping side portions 23 with the tubular projections 37 and pin 43 extending through holes 39 and 41, and with feet 45 extending through holes 47 into contact with glass 3. One of the guides 21, such as the upper guide, is then placed in the division bar 7 with shoes 31 in side channels 13 and 15 and the glass is pushed generally vertically to thread the forward edge thereof in the division bar. As the forward edge of the glass enters the division bar, the inwardly extending wall portions 51 (FIG. 4) of bar 7 pinch the bowed side portions 23 of the weatherstripping inwardly until the latter are generally flat. Since the side portions 23 have a tendency to flare out, due to the original shape and resiliency thereof, they are kept in sliding engagement with portions 51, and keep the midportion of the weatherstripping from fluttering or flapping under high wind velocity conditions.

When the opposite end of the weatherstripping 19 is reached as the latter is threaded into the division bar 7, the guide 21 on such end is inserted in the channels 13 and 15 in the same manner as previously described. The window glass and the slide device will then move up and down as a unit in the division bar 7. The shoes 21 substantially eliminate the possibility of any rocking or sideward motion of the glass, and at the same time slide easily in the channels 13 and 15 to permit the window to be raised and lowered with little effort. Moreover, the joint provided by the division bar and device 17 is substantially watertight.

A modification of the guide 21 is shown in FIG. 10 at 21a. Guide 21a comprises two shoes 31a each of which has a rubber body portion 33a inside an elongated metal insert 35a which has a generally U-shaped horizontal cross section. Each shoe 31a has a centrally located tubular projection 37a extending toward the other shoe in the same manner as shoes 31. A pin 43a extends from one tubular projection 37a to the other projection. Flocking material 49 is provided over the surface of the guide 21a for facilitating sliding movement of the latter in the side channels 13 and 15. The shoes 31a do not have foot portions similar to feet 45, but rather are adapted to press against the adjacent weatherstripping sides throughout the length of the shoes. The guides 21a are installed and function in the same general manner as guides 21.

Since the edge of the window is interlocked with the division bar, it is unnecessary to use an X-arm type of regulator mechanism to maintain the leading edge of the window in the division bar. It will therefore be seen that the slide device of this invention permits the use of a single arm regulator mechanism while providing for window stability throughout the complete range of movement of the window without creating any undue drag on the latter.

While this invention has been described herein with reference to the window glass in the front door of an automotive vehicle, it will be understood that it is also applicable to other windows in a vehicle, such as, for example, rear door windows, or the rear quarter windows, if it is desired to provide a single point connection, as opposed to a two point connection, between the window and the regulator mechanism.

In view of the foregoing it will be seen that several objects and features of this invention are attained.

It will be understood that the invention is not to be limited to the exact constructions shown and described, but that various changes and modifications may be made without departing from the spirit and scope of the invention, as defined in the appended claims.

I claim:

1. A device for guiding the movement of a window glass in a recessed support comprising weatherstripping portions extending along the forward edge of the glass on opposite sides of the latter, a guide having generally vertical portions on opposite sides of said glass and outside said weatherstripping portions, said generally vertical portions extending into said support and being movable therein, and generally horizontal connecting means extending from and between said generally vertical portions through a hole in said glass for connecting the weatherstripping and glass together and to said generally vertical portions.

2. A device as set forth in claim 1 wherein each of said generally vertical portions is slidable in said support and has flocking on the outside thereof for facilitating sliding movement in the support.

3. A device as set forth in claim 1 wherein each generally vertical portion includes a channel-shaped metal member slidable in said support, each metal member having flocking on the outside thereof for facilitating sliding movement in the support.

4. A device as set forth in claim 1 wherein each generally vertical portion includes a channel-shaped metal member, foot members projecting from opposite ends of said metal member through holes in the weatherstripping into engagement with said glass.

5. A device as set forth in claim 1 wherein each generally vertical portion includes a channel-shaped metal member slidable in said support, rubber material in said metal member, and flocking on the outside of said metal member for facilitating sliding movement in the support.

6. A device as set forth in claim 1 wherein said means comprises a metal pin, said vertical portions having holes therein in which the opposite ends of said pin are located.

7. A slide device for guiding the movement of a window glass in a division bar having two opposed channels therein, comprising weatherstripping formed about the end edge of the glass and having side portions on opposite sides of the glass, a first guide adjacent the upper end of the glass and a second guide adjacent the lower end of the glass, each of said guides comprising two generally vertical extending shoes on opposite sides of said glass and said weatherstripping, said shoes being located in said channels, and generally horizontal connecting means extending between said shoes through generally horizontally aligned holes in said weatherstripping and the glass for connecting said weatherstripping to said glass together and to said shoes.

8. A slide device as set forth in claim 7 wherein each of said shoes has an upper and a lower foot extending through holes in said weatherstripping into engagement with the glass.

9. A slide device as set forth in calim 8 wherein each of said shoes has flocking on the outside thereof to facilitate sliding in the respective channel.

10. A slide device as set forth in claim 7 wherein each of said shoes comprises a U-shaped metal channel member, rubber material in said channel member, and flocking on the outside of said channel member to facilitate sliding in the respective channel in the division bar, said connecting means for each guide comprising tubular projections extending toward one another from each of the opposed shoes of the respective guide, and a metal pin in said tubular projections and extending through said hole in said glass.

11. A slide device as set forth in claim 10 wherein each of said shoes has an upper and a lower foot extending through holes in said weatherstripping into engagement with the glass.

12. A slide device as set forth in claim 11 wherein each of said shoes has flocking on the outside thereof to facilitate sliding in the respective channel.

References Cited

UNITED STATES PATENTS

| | | | |
|---|---|---|---|
| 2,893,781 | 7/1959 | Hoag et al. | 49—144 |
| 3,141,664 | 7/1964 | Chupick | 49—440 X |
| 3,151,859 | 10/1964 | Miles et al. | 49—431 X |

FOREIGN PATENTS 497,098 12/1938 Great Britain.

DAVID J. WILLIAMOWSKY, *Primary Examiner.*

J. K. BELL, *Assistant Examiner.*